US009359076B2

(12) United States Patent
Ivester et al.

(10) Patent No.: US 9,359,076 B2
(45) Date of Patent: Jun. 7, 2016

(54) COMPACT AIRCRAFT GALLEY AND LAVATORY ARRANGEMENT AND ARTICULATING LAVATORY PARTITION FOR AN AIRCRAFT

(71) Applicant: B/E Aerospace, Inc., Wellington, FL (US)

(72) Inventors: Clarence Ivester, Arlington, WA (US); Jefferey McKee, Duvall, WA (US); Wade Johnson, Edmonds, WA (US); James Brian Hauser, Mukilteo, WA (US); Robert Papke, Camano Island, WA (US); David R. Benton, Edmonds, WA (US); Frank E. Hashberger, Snohomish, WA (US)

(73) Assignee: B/E Aerospace, Inc., Wellington, FL (US)

( * ) Notice: Subject to any disclaimer, the term of this patent is extended or adjusted under 35 U.S.C. 154(b) by 118 days.

(21) Appl. No.: 14/175,537

(22) Filed: Feb. 7, 2014

(65) Prior Publication Data

US 2014/0224930 A1    Aug. 14, 2014

Related U.S. Application Data

(60) Provisional application No. 61/763,284, filed on Feb. 11, 2013, provisional application No. 61/845,250, filed on Jul. 11, 2013.

(51) Int. Cl.
*B64D 11/00* (2006.01)
*B64D 11/02* (2006.01)
*B64D 11/04* (2006.01)

(52) U.S. Cl.
CPC ............... *B64D 11/02* (2013.01); *B64D 11/04* (2013.01)

(58) Field of Classification Search
None
See application file for complete search history.

(56) References Cited

U.S. PATENT DOCUMENTS

| 7,152,257 | B2 † | 12/2006 | Stratmann | |
|---|---|---|---|---|
| 8,387,916 | B2 † | 3/2013 | Baatz | |
| 2013/0001359 | A1 † | 1/2013 | Schliwa | |
| 2013/0126672 | A1 † | 5/2013 | Weitzel | |
| 2013/0206904 | A1 † | 8/2013 | Gee | |
| 2013/0334369 | A1 * | 12/2013 | Schliwa | B64D 11/02 244/118.5 |
| 2014/0027572 | A1 † | 1/2014 | Ehlers | |
| 2014/0077033 | A1 * | 3/2014 | Scown | B64D 11/02 244/118.5 |
| 2014/0123383 | A1 † | 5/2014 | Detjen | |
| 2014/0123571 | A1 † | 5/2014 | Swain | |

\* cited by examiner
† cited by third party

FOREIGN PATENT DOCUMENTS

WO    2012110643 A1    8/2012

OTHER PUBLICATIONS

International Search Report, May 27, 2014, 5 pages.

*Primary Examiner* — Christopher P Ellis
*Assistant Examiner* — Richard G Davis
(74) *Attorney, Agent, or Firm* — Fulwider Patton LLP (57) ABSTRACT

A combination lavatory and galley arrangement for aircraft includes a lavatory portion having adjacent inboard and outboard lavatories, and a galley portion, and can be located aft of aft aircraft aft doors, and can at least partially rearwardly extend into the aircraft's aft pressure dome. The inboard and outboard lavatories can be separated by a movable wall or partition to provide access for persons with restricted mobility, and can be provided in a modular housing to facilitate retrofit assembly within an aircraft. The movable wall can be an articulating movable lavatory partition movable between a first, linearly extended configuration and a second, folded configuration in a stowed position to provide entry for persons with restricted mobility.

17 Claims, 14 Drawing Sheets

COMPACT AIRCRAFT GALLEY AND LAVATORY ARRANGEMENT AND ARTICULATING LAVATORY PARTITION FOR AN AIRCRAFT

CROSS-REFERENCES TO RELATED APPLICATIONS

This application is based upon and claims priority from U.S. Application No. 61/763,284, filed Feb. 11, 2013, and U.S. Application No. 61/845,250, filed Jul. 11, 2013, incorporated by reference in their entirety.

BACKGROUND

While all aircraft strive for efficiency and economy in its arrangement of components, this is particularly critical in smaller commercial aircraft. Single aisle aircraft are especially stringent when it comes to the number of seats that can be accommodated, since each additional row of seats, or seats themselves, represents a higher percentage of profitability as compared with larger aircraft. However, the floor plans of these smaller aircraft are typically fixed by other constraints, thereby limiting the number of seats available. Any arrangement that allows for additional seats represents a significant advance that corresponds with a consequential opportunity for profitability.

Figure 1:
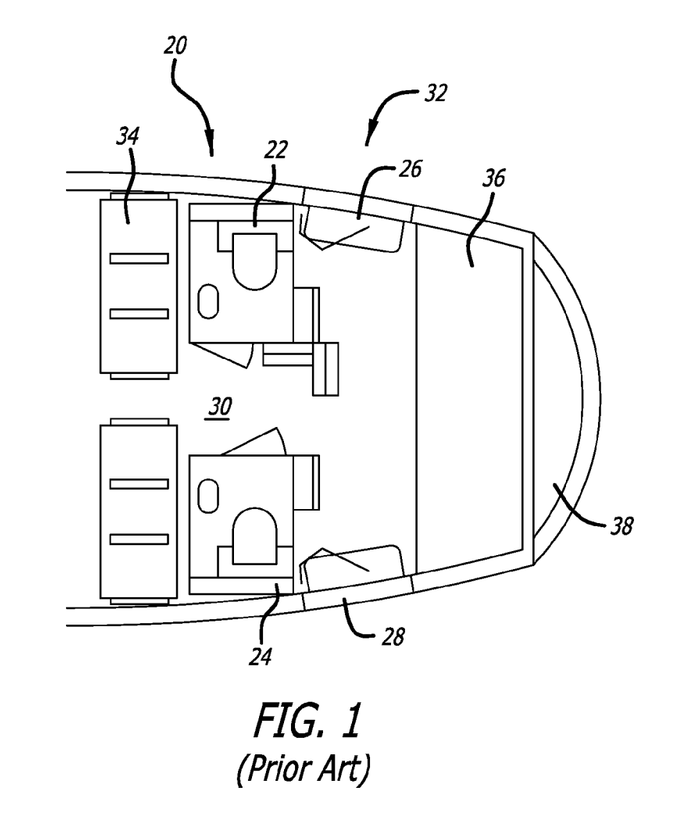
FIG. 1 is a plan view of a prior art single aisle aircraft.
Figure 2:
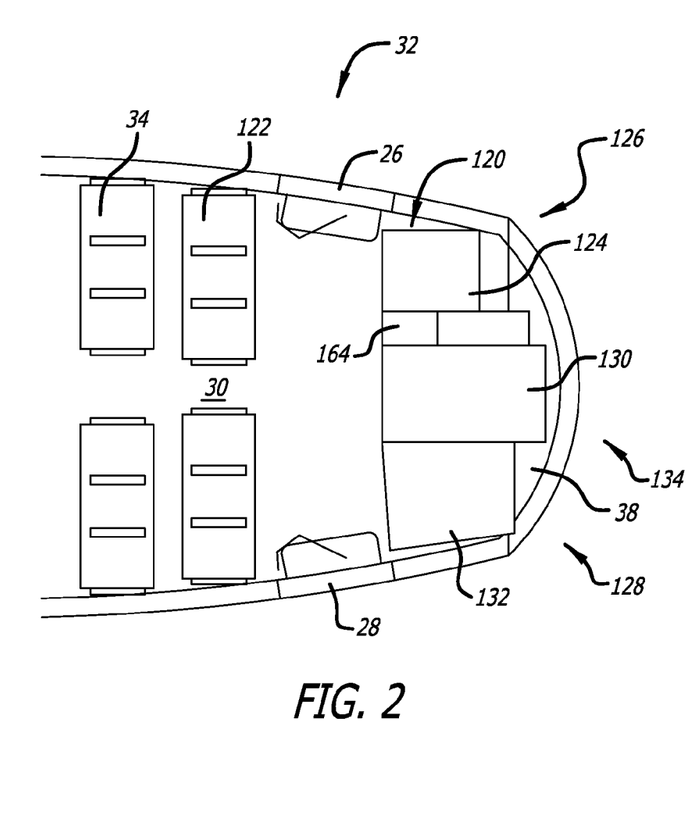
FIG. 2 is a plan view of a first preferred embodiment of the present invention.

The majority of single-aisle aircraft include an aft lavatory and galley arrangement 20 like that shown in FIG. 1. In this arrangement, first and second lavatories 22, 24 are positioned forward of aft or rear doors 26, 28 on either side of a center aisle 30 of aircraft 32, and are located behind a typically last or aft-most row of passenger seats 34. In addition, a full galley 36 is located aft of the rear doors and forward of the aircraft's pressure dome 38. The full galley typically extends across the full width of the rearmost portion of the passenger cabin, and includes galley carts, storage units, ovens, beverage makers, and the like.

In today's commercial airline industry, operators prefer passenger cabin arrangements that maximize the number of seats available for passengers. Unfortunately, increasing the number of seats in an aircraft can reduce the amount of space available for lavatories and food service galleys. In addition, while designs of lavatories are known that have removable dividers, these are typically stowed within the useable space of the lavatory, usually acting like an additional bi-fold door, but the manner in which such prior art dividers are stowed reduces the useable inner volume of the lavatory.

Accordingly, there is a need for a high passenger solution ("HPS") for an aft portion of a single-aisle aircraft, which provides space for at least one additional row of passenger seats, and provides a galley that is capable of supporting a satisfactory level of food service for passengers. In addition, there is a need for such a high passenger solution that includes at least one lavatory that is accessible by persons with restricted mobility (PRM), and at least one cabin attendant seat (CAS). There is also a need for a high passenger solution that allows a lavatory partition to be removed from the center of the lavatory and stowed against an entry door, while leaving the interior of the lavatory substantially unobstructed for entry, egress and use of disabled passengers, that does not interfere with the normal operation of either lavatory entry door for a dual lavatory, and that will not allow the partition to be opened if either lavatory door is closed, eliminating the need for special locks, or access tools. The present invention satisfies these and other needs.

SUMMARY OF THE INVENTION

Briefly, and in general terms, the invention provides for a combination lavatory and galley arrangement for aircraft that includes adjacent inboard and outboard lavatories that can be separated by a movable wall, such as an articulating movable lavatory wall or partition, to facilitate optional access for persons with restricted mobility, and that can be provided in a modular housing with separate walls to facilitate retrofit assembly within an aircraft. The combination lavatory and galley arrangement for aircraft can extend into the aircraft's aft pressure dome to provide an optimum amount of lavatory and galley space.

The present invention accordingly provides for a combination lavatory and galley arrangement having a galley portion on a first side of the combination lavatory and galley arrangement and a lavatory portion on an opposing second side of the combination lavatory and galley arrangement. The lavatory portion includes an inboard lavatory and an outboard lavatory, with inboard and outboard entry doors. The galley portion may include a sink, a plurality of food service inserts, an electrical panel, a galley waste disposal unit, as well as stowage for multiple standard storage units, stowage for a plurality of galley carts, stowage for at least one trash trolley, and a trolley stowage bay configured to receive one or more half-size trolleys, that can be cooled by chilled air circulated through the trolley stowage bay. In a presently preferred aspect, the combination lavatory and galley arrangement is located aft of aft aircraft aft doors. In another presently preferred aspect, the aircraft includes an aft pressure dome, and the combination lavatory and galley arrangement at least partially rearwardly extends into the pressure dome.

In another presently preferred aspect, each of the inboard and outboard lavatories is forward-facing, and includes a toilet and a sink. In another presently preferred aspect, the inboard lavatory is adjacent to the galley portion.

In another presently preferred aspect, the entry doors may be single panel doors, or multi-panel doors, for example. In another presently preferred aspect, a cabin attendant seat stowage compartment is disposed between the galley portion and the inboard lavatory, and the cabin attendant seat preferably is movable between a stowed position and a deployed position. In another presently preferred aspect, the cabin attendant seat includes a foldable seat portion and a foldable back portion.

In another presently preferred aspect, the combination lavatory and galley arrangement includes a movable partition between the inboard and outboard lavatories that is movable between a stowed position and a deployed position, such that the inboard and outboard lavatories have a substantially equal first width when the movable partition is in the stowed position, and the width is sufficiently wide to permit persons without restricted mobility to access and use the inboard and outboard lavatories, and the outboard lavatory has a second width greater than the first width when the movable partition is in the deployed position, such that the second width provides the outboard lavatory with a widened configuration that is sufficiently wide to permit a person with restricted mobility to access and use the outboard lavatory. In another presently preferred aspect, the movable partition may be configured to be articulated, or may be bendable. In another presently preferred aspect, the inboard lavatory is deeper than the outboard lavatory, such that a toilet in the inboard lavatory is positioned at least partially aft of a toilet in the outboard lavatory.

In another presently preferred aspect, the lavatory portion includes a modular housing containing the inboard lavatory and the outboard lavatory, and the modular housing includes a floor, inboard and outboard toilets, and inboard and outboard sinks. In another presently preferred aspect, the modular housing is dimensioned such that the modular housing is configured to be loaded aboard the aircraft through an aft door and assembled in a permanent location at a rear portion of the aircraft. In another presently preferred aspect, the modular housing has a center of gravity that is sufficiently low to preclude the need for an overhead tie. In another presently preferred aspect, the modular housing comprises associated non-structural exterior walls.

In another presently preferred aspect, the movable partition may be an articulating movable lavatory partition including articulating, folding partition sections, such that the articulating movable lavatory partition is movable between a first, linearly extended configuration at an approximate middle deployed position between the inboard and outboard lavatories, and a second, folded configuration in a stowed position against an interior surface of one of the inboard and outboard entry doors leaving the inboard and outboard lavatories in an unpartitioned configuration with a common interior unobstructed for entry, egress and use of persons with restricted mobility. In another presently preferred aspect, the inboard and outboard lavatories include a partition frame including imbedded upper slide channels and a floor panel including imbedded lower slide channels, and the articulating, folding partition sections include corresponding upper rollers and lower rollers, allowing for fore and aft bifold movement of the articulating, folding partition sections. In another presently preferred aspect, the articulating movable lavatory partition is configured to be secured in the first linearly extended configuration, such that the partition cannot be opened while the outboard lavatory door is closed. In another presently preferred aspect, the inboard and outboard entry doors are configured to be latched to a door header and the floor panel. In another presently preferred aspect, the upper and lower rollers of the articulating, folding partition sections can move along the upper and lower slide channels toward the outboard entry door to fold and stack against an inner portion of the outboard entry door in the folded configuration in a final stowed position of the articulating movable lavatory partition. In another presently preferred aspect, the door header of the outboard entry door includes cutouts, to allow the rollers to pass through the door header, and a door footer includes cutouts to allow the rollers to pass through the door footer as the articulating, folding partition sections stack against the inner portion of the open outboard entry door in the final stowed position of the articulating, folding partition.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Referring to FIG. 1, in a common conventional aircraft lavatory arrangement 20, first and second lavatories 22, 24 are positioned forward of aft or rear doors 26, 28 on either side of a center aisle 30 of aircraft 32, and are located behind a typically last or aft-most row of passenger seats 34. In addition, a full galley 36 is located aft of the rear doors and forward of the aircraft's pressure dome 38. The full galley typically extends across the full width of the rearmost portion of the passenger cabin, and includes galley carts, storage units, ovens, beverage makers, and the like.

Referring to the drawings, which are provided for purposes of illustration and by way of example, the present invention provides for a combination lavatory and galley arrangement that satisfies the needs described above.

Referring to FIGS. 2-5, in one presently preferred embodiment of a combination lavatory and galley arrangement 120 at least one additional aft-most row of passenger seats 122 is located forward of the aft or rear doors 26, 28 on either side of a center aisle 30 of a single-aisle aircraft 32, and are located behind the typical last or aft-most row of passenger seats 34 of the prior art. The combination lavatory and galley arrangement of this embodiment is preferably located aft of the aft or rear doors, and at least partially rearwardly extends into the aircraft's pressure dome. In the arrangement shown in FIGS. 2-5, the combination lavatory and galley arrangement includes a galley portion 124 on one side 126 of the combination lavatory and galley arrangement, and a lavatory portion 128 including a pair of forward-facing inboard and outboard lavatories 130, 132 on an opposite side 134 of the combination lavatory and galley arrangement.

Figure 3:
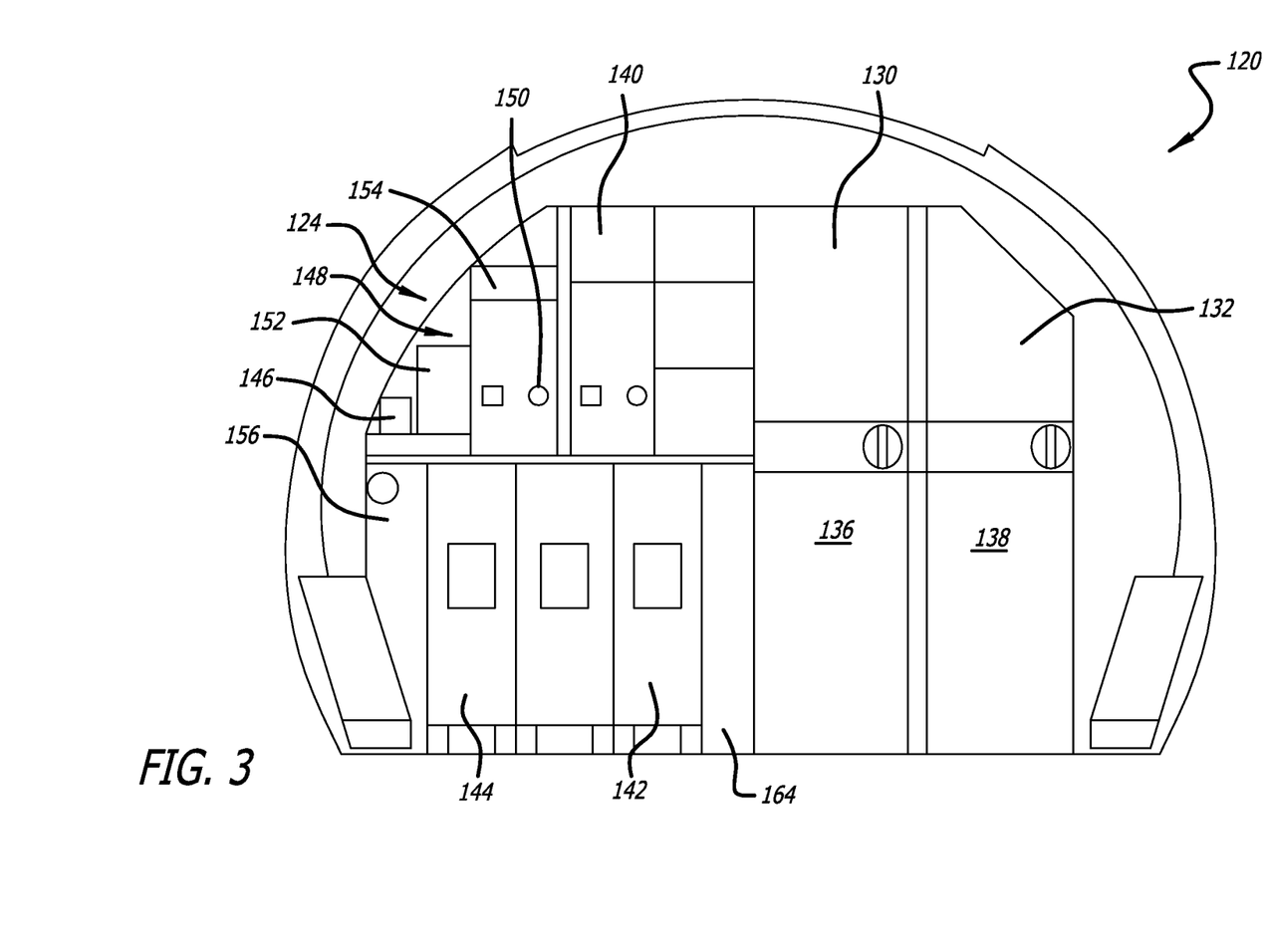
FIG. 3 is an enlarged front view looking rearward at the embodiment of FIG. 2.
Figure 4:
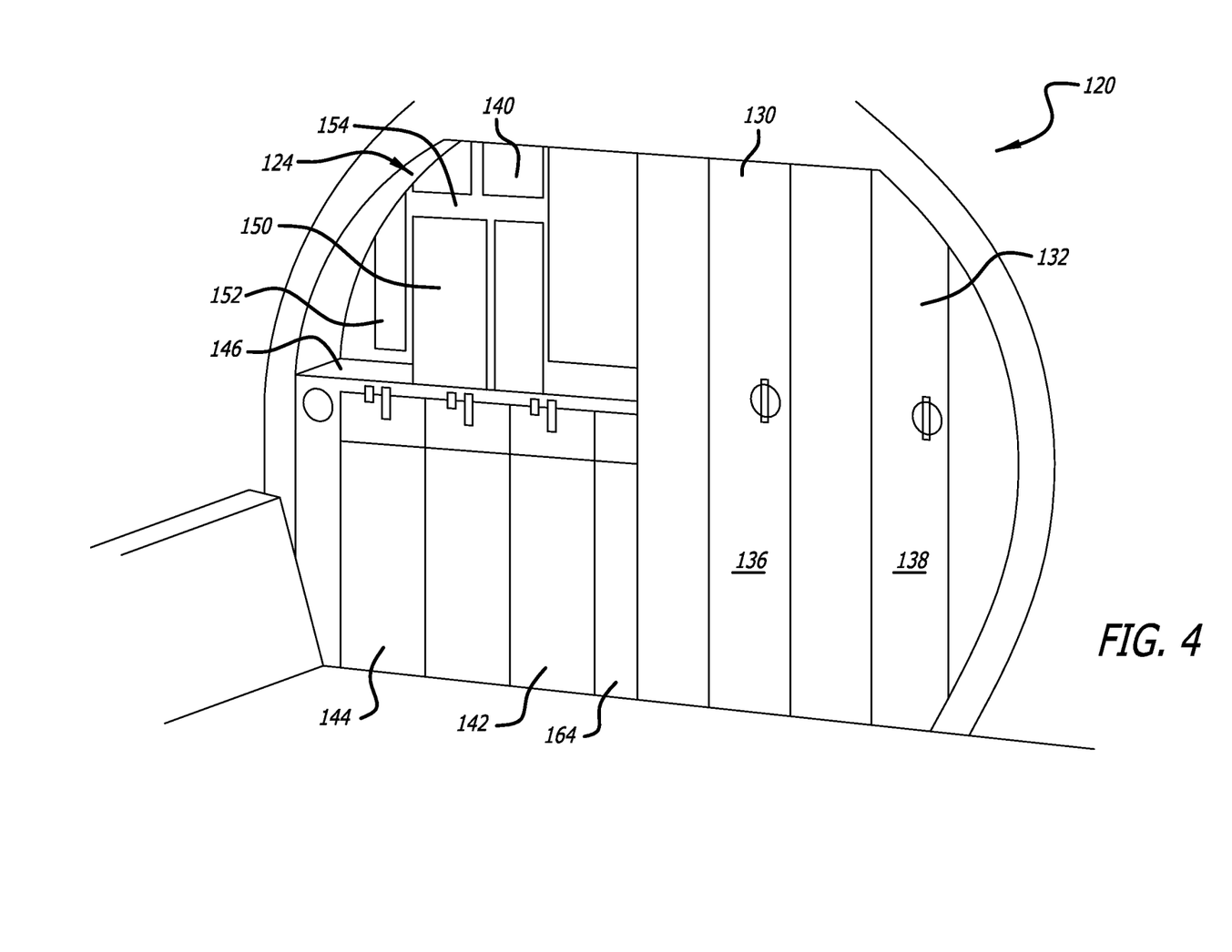
FIG. 4 is a perspective view looking rearward at the embodiment of FIG. 2.
Figure 5:
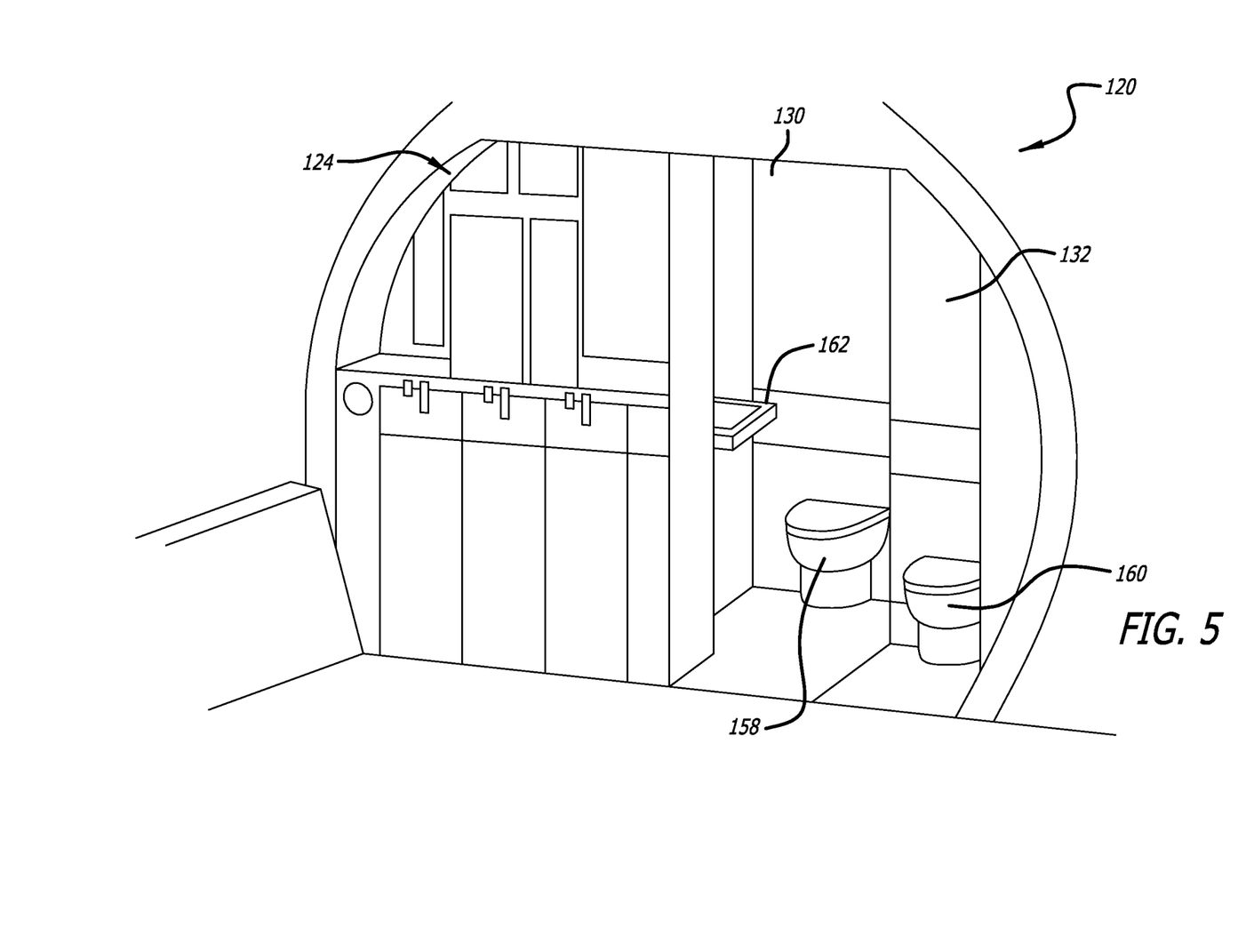
FIG. 5 is the perspective view of FIG. 4 with the lavatory doors open.

As shown in FIGS. 3 and 4, each of the pair of lavatories includes an entry door 136, 138. The entry doors may be either single panel doors or multi-panel doors, for example, although other similar types of entry doors may also be suitable. The galley portion can include stowage 140 for multiple standard storage units, stowage 142 for a plurality of galley carts or trolleys, stowage 144 for at least one trash trolley, a sink 146, and a plurality of food service inserts 148 including ovens 150 and a water boiler 152. An electrical panel 154 is also provided. In addition, as shown in FIG. 3, the galley portion can include a galley waste disposal unit (GWDU) 156. As shown in FIG. 5, each of the pair of lavatories typically includes a toilet 158, 160 and a sink 162 (only one of which is shown). Alternatively, one or both of the lavatories can include a urinal (not shown).

Figure 6A:
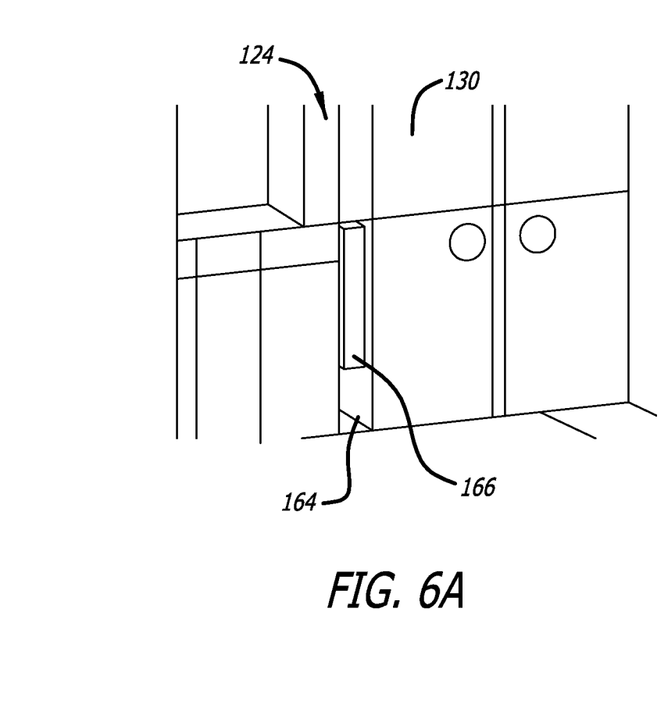
FIG. 6A is a perspective view of a stowage compartment for a cabin attendant seat.
Figure 6B:
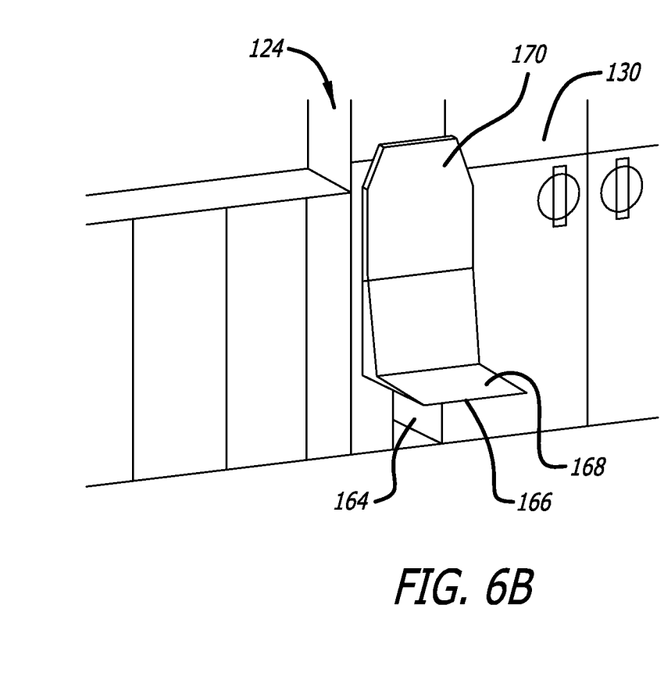
FIG. 6B is a perspective view of a deployed cabin attendant seat according to a first preferred embodiment.

As shown in FIGS. 6A and 6B, a cabin attendant seat (CAS) stowage compartment 164 can be provided between the galley portion and the inboard lavatory. A cabin attendant seat 166 is shown in a stowed position in FIG. 6A, and in a deployed position in FIG. 6B. The cabin attendant seat can include a foldable seat portion 168 and a foldable back portion 170.

Figure 7A:
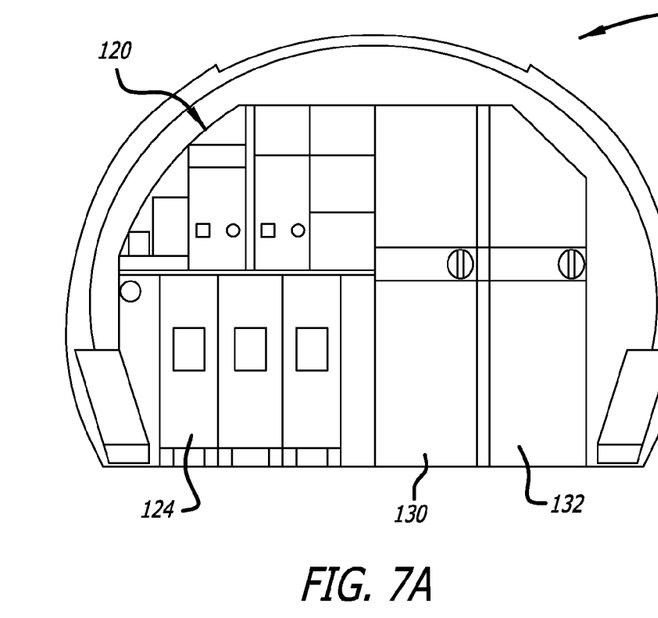
FIG. 7A is a front view looking rearward of a second embodiment of the present invention.
Figure 7B:
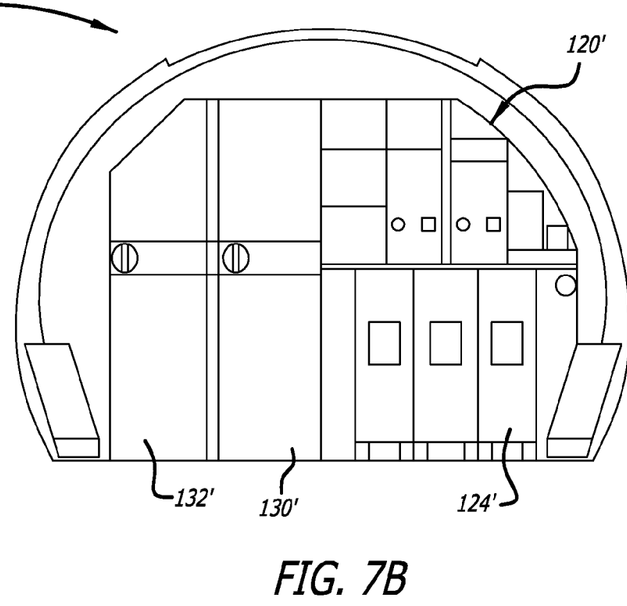
FIG. 7B is a front view looking rearward of a variation that is generally a mirror image of the arrangement of the second embodiment of FIG. 7A.
Figure 8:
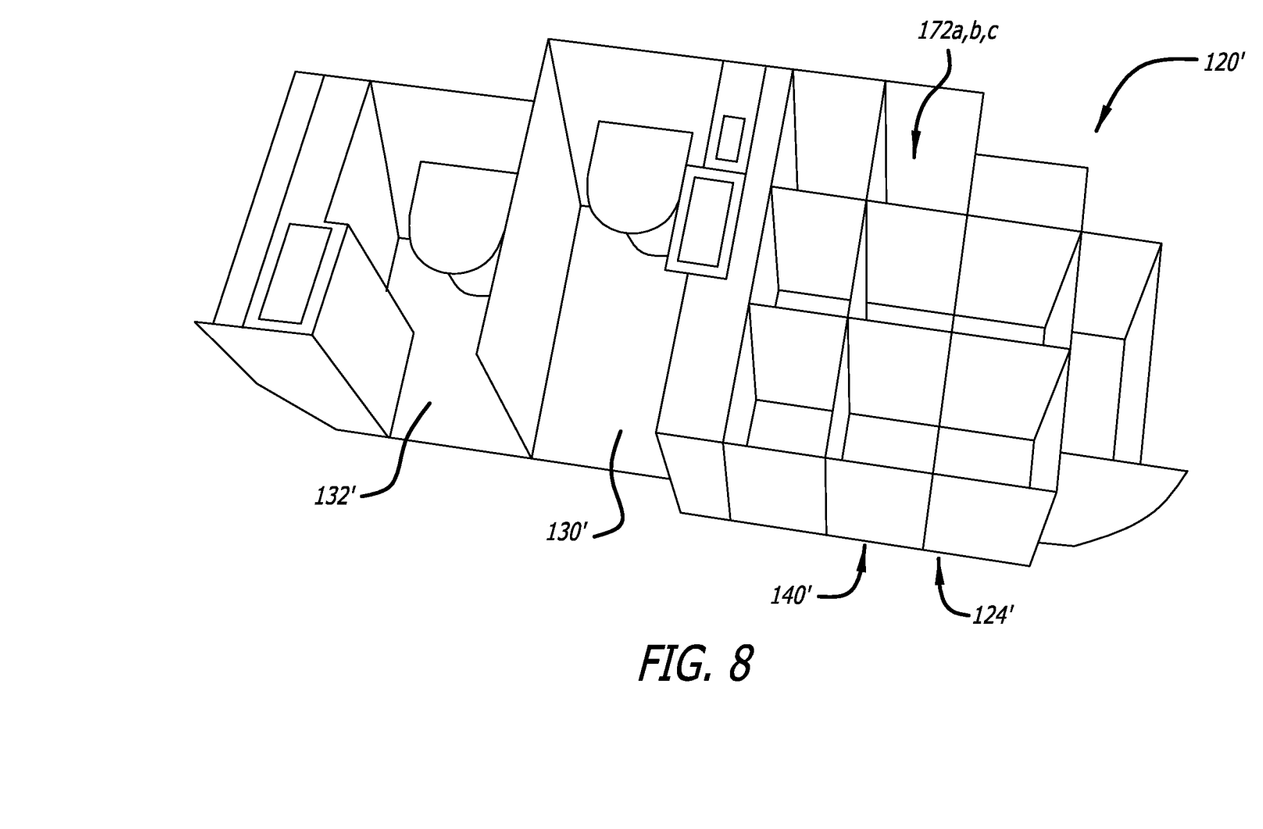
FIG. 8 is an elevated perspective view of the lavatories and trolley cart storage areas.

As shown in FIGS. 7A and 7B, the combination lavatory and galley arrangement shown in FIGS. 2-6B and 7A can be rearranged like the combination lavatory and galley arrangement 120' shown in FIG. 7B, which is generally a mirror image of the arrangement 120 described above, but is otherwise substantially the same. Because of certain asymmetries in an aircraft's construction, however, the arrangement 120' may include one or more additional half-size galley carts or trolleys 172a,b,c, shown in FIG. 8, that is not possible in combination lavatory and galley arrangement 120. As is illustrated in FIG. 8, the mirror image combination lavatory and galley arrangement includes a galley portion 124' that can include a trolley stowage bay 140' that is capable of receiving a plurality of the half-size galley carts or trolleys, typically arranged two to three deep. The plurality of half-size galley carts or trolleys typically can be cooled by chilled air circulated through the trolley stowage bay of the galley portion.

Figure 9A:
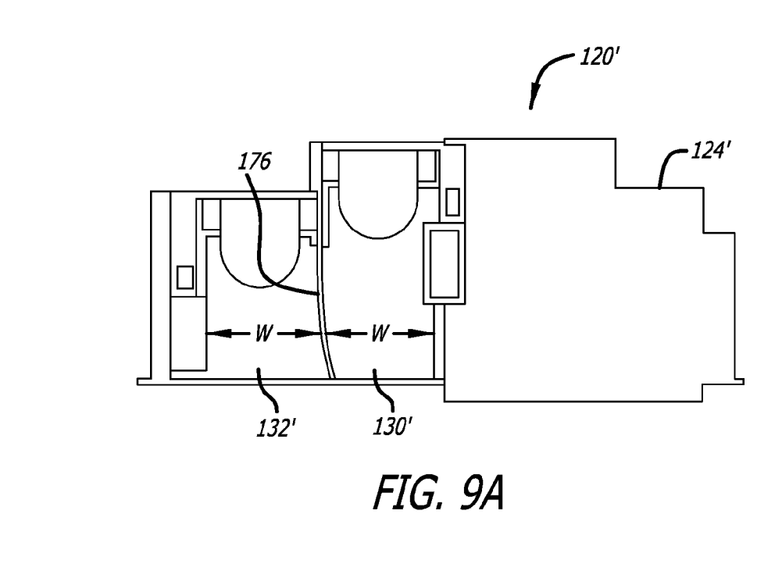
FIG. 9A is a plan view of another embodiment with a flexible wall between the lavatories.
Figure 9B:
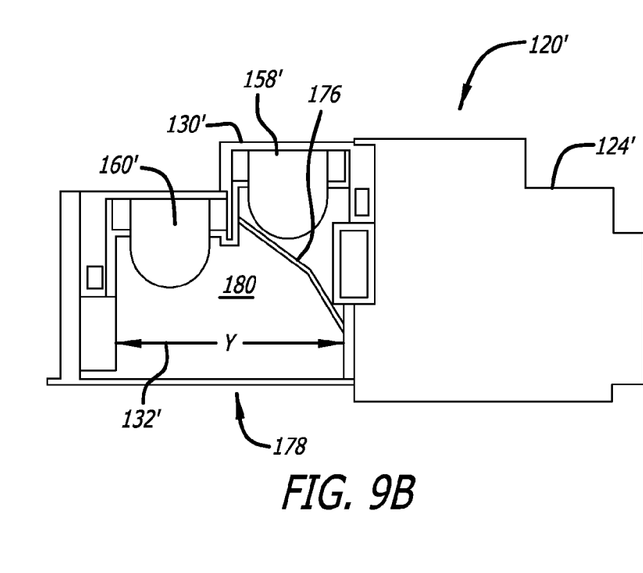
FIG. 9B is a plan view of the embodiment of FIG. 9A with the flexible wall in a deployed position.

As shown in FIGS. 9A,B, a movable wall or partition 176 can be provided between a pair of inboard and outboard lavatories 130', 132'. The movable wall or partition can be fixed in a stowed position as shown in FIG. 9A, and moved to and secured in a deployed position as shown in FIG. 9B. When the movable wall or partition is in the stowed position shown in FIG. 9A, both of the inboard and outboard lavatories have substantially the same width "w," which is preferably sufficiently wide to permit persons without restricted mobility to access and use the inboard and outboard lavatories. As shown in FIG. 9B, when the movable wall or partition is in the deployed position, the outboard lavatory has an increased width "y," providing the outboard lavatory with a widened configuration 178 for a person with restricted mobility (PRM) that is sufficiently wide to permit a person with restricted mobility to access and use the outboard lavatory. As shown in FIG. 9B, the movable wall or partition can be articulated or otherwise bendable to provide a maximum amount of floor space 180 within the outboard lavatory in the widened configuration. Also, the inboard lavatory can be deeper than the outboard lavatory, such that the inboard toilet is positioned at least partially aft of the outboard toilet to maximize the swing of the movable wall or partition between its stowed and deployed positions, thereby maximizing the available floor space in the widened configuration.

Figure 10:
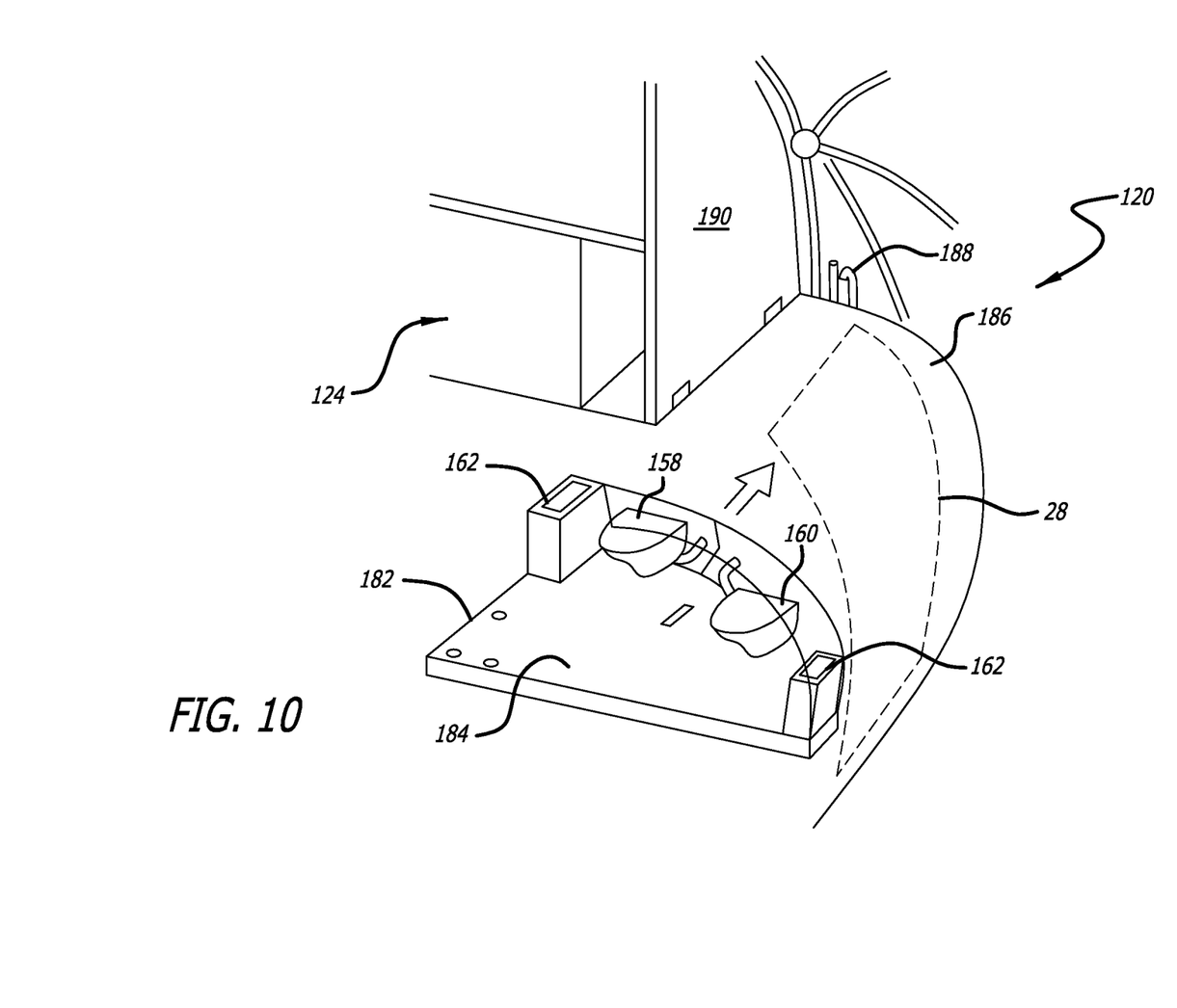
FIG. 10 is an elevated, perspective view partially in phantom of another embodiment of the lavatories including a modular lower section.

An embodiment of a combination lavatory and galley arrangement similar to that described above is illustrated in FIG. 10. In this configuration, the pair of forward-facing inboard and outboard lavatories are provided in a modular lower section (MLS) 182. The modular lower section typically includes a floor or base 184, both inboard and outboard toilets, both sinks, as well as all associated plumbing, fixtures, and the like. The inboard and outboard lavatories and the modular lower section can alternatively include one or more urinals. The modular lower section is preferably sized such that the modular lower section can be loaded aboard the aircraft through one of the aft or rear doors, and assembled in a permanent location 186 at the rear of the aircraft. Once all plumbing and waste connections are made between the modular lower section and the aircraft's systems 188, such as plumbing and electrical systems, for example, exterior walls (not shown) can be assembled to enclose the inboard and outboard lavatories. Preferably, the modular lower section has a center of gravity that is sufficiently low to preclude the need for an overhead tie, and the associated exterior walls are typically non-structural. In one embodiment, the lavatories and the galley share loads through a center wall 190 located between the lavatory portion and the galley portion.

As is illustrated in FIGS. 11-19, in a presently preferred variation of the foregoing embodiments of a combination lavatory and galley arrangement described above can include an articulating movable lavatory wall or partition 192 that can be moved between a first, linearly extended configuration 194 at an approximate middle or center deployed position 196 between the pair of forward-facing inboard and outboard lavatories 130, 132, 130', 132', and a second, folded configuration 198 in a stowed position 200 against an interior surface 202 of one of the inboard and outboard entry doors 136, 138, 136', 138', while leaving the inboard and outboard lavatories in an unpartitioned configuration 204 with a common interior 206 of both of the inboard and outboard lavatories unobstructed for entry, egress and use of persons with restricted mobility, such as disabled passengers, for example.

Figure 11:
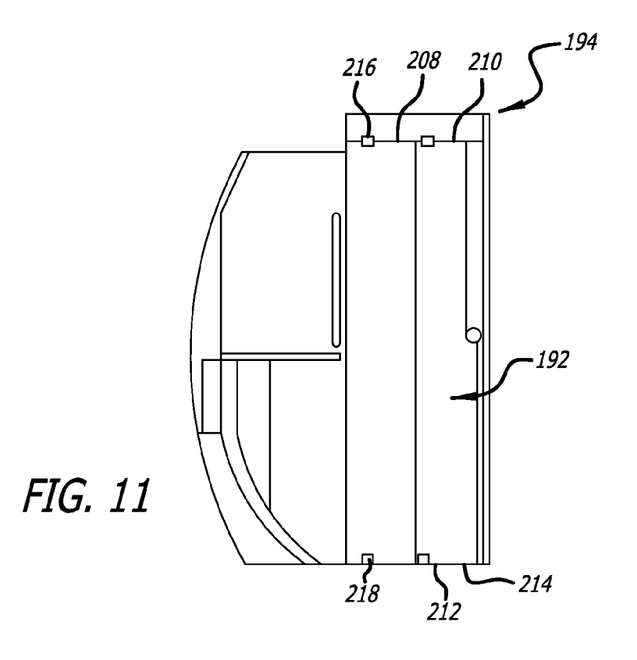
FIG. 11 is a cross-sectional interior view looking outboard from an inboard lavatory of a combination lavatory and galley arrangement illustrating a variation including an articulating movable lavatory wall or partition, shown in a first, linearly extended configuration in a deployed position.
Figure 12:
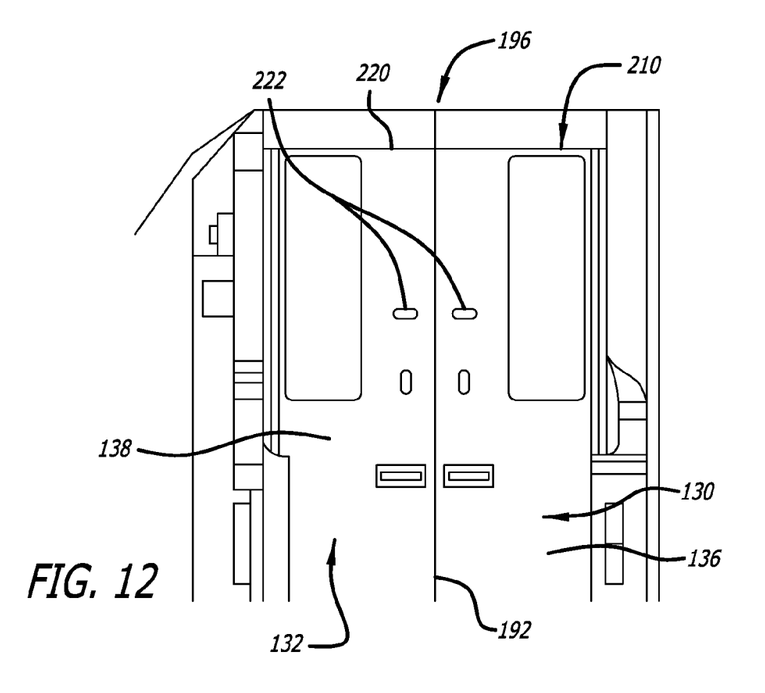
FIG. 12 is a cross-sectional view looking forward taken along line 12-12 of FIG. 11, showing an interior upper portion of the inboard and outboard lavatory doors.
Figure 13:
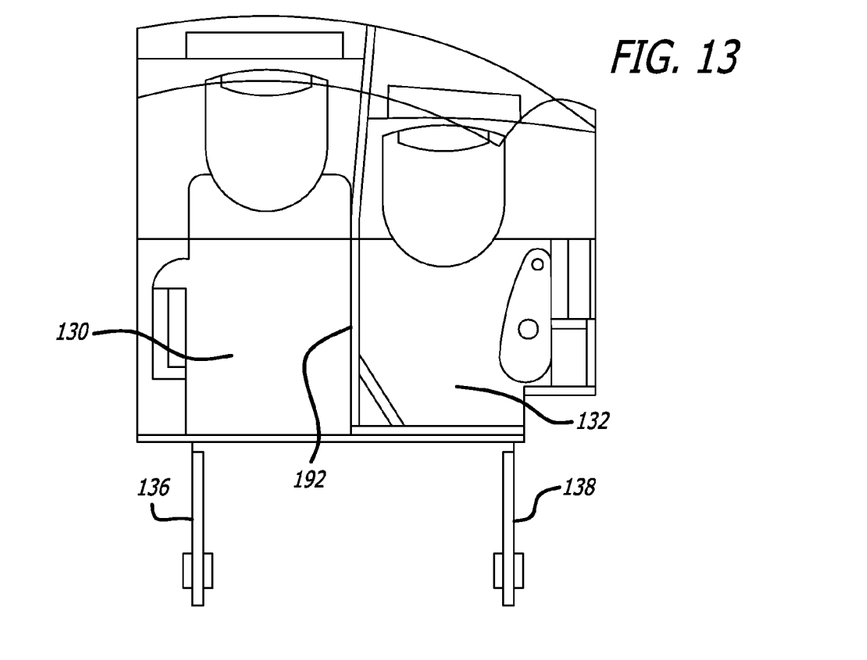
FIG. 13 is a top plan view of the combination lavatory and galley arrangement of FIG. 11, showing the inboard and outboard lavatory doors unlatched at the beginning of a stowing operation for moving the articulating movable lavatory wall or partition to a second, folded configuration in a stowed position.
Figure 14:
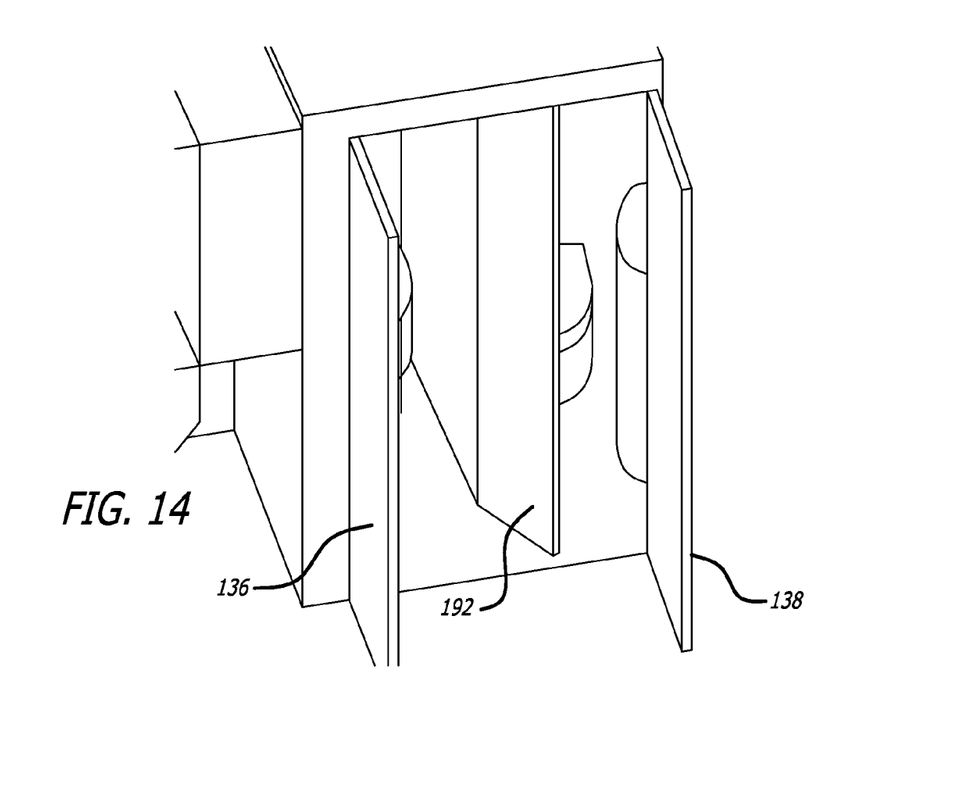
FIG. 14 is a top perspective view similar to FIG. 13.
Figure 15:
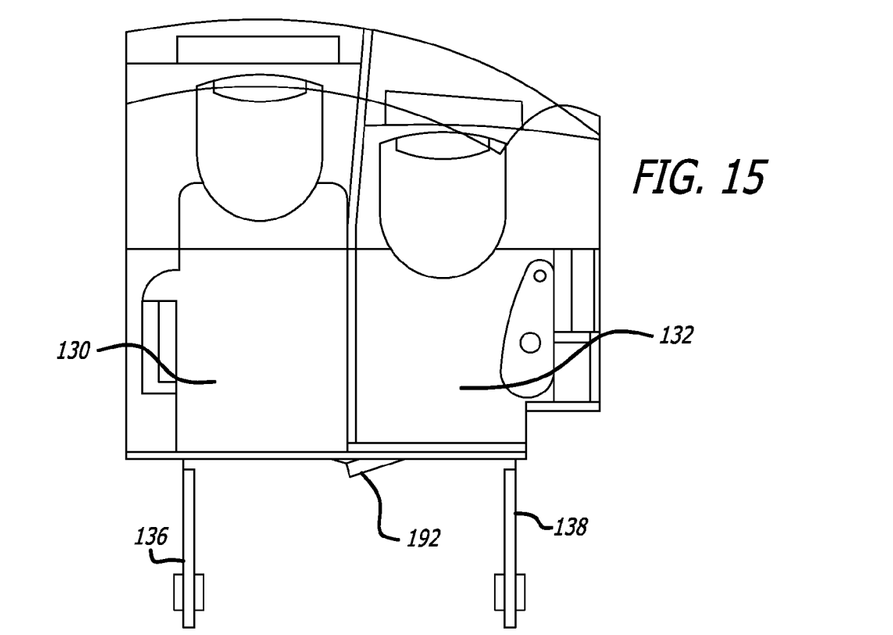
FIG. 15 is a top plan view similar to FIG. 13, showing further movement of the articulating movable lavatory wall or partition.
Figure 16:
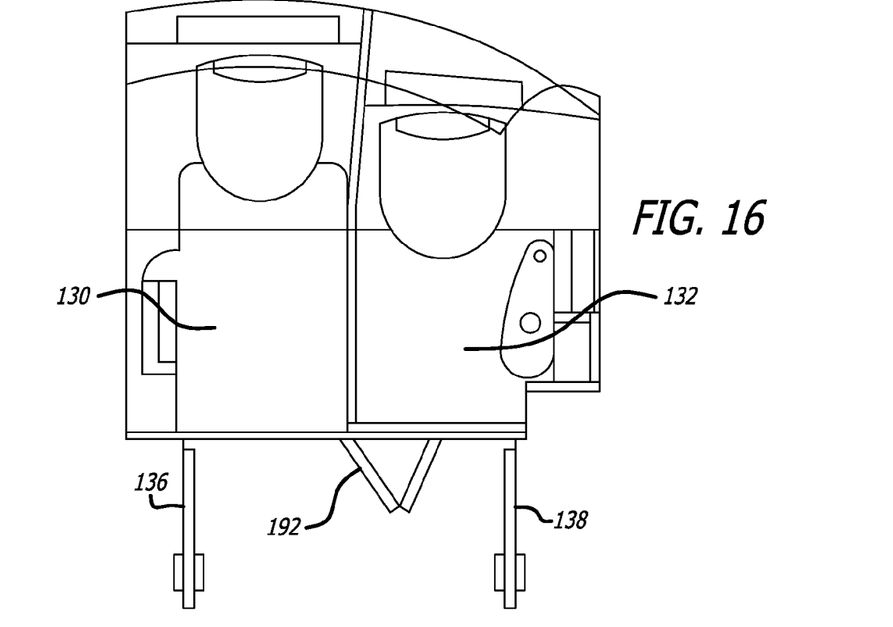
FIG. 16 is a top plan view similar to FIG. 15, showing further movement of the articulating movable lavatory wall or partition.

As is illustrated in FIG. 11, the inboard and outboard lavatories include a partition frame 208 including imbedded upper slide channels or guides 210, and a floor panel 212 including imbedded lower slide channels or guides 214. The articulating, folding partition sections include corresponding upper rollers 216 and lower rollers 218, shown in their approximate locations, allowing for fore and aft bifold movement of the articulating, folding partition sections. The partition is typically secured in the first linearly extended configuration by a ring latch (not shown) or a similar suitable latch, such that the partition cannot be opened while the outboard lavatory door is closed As is illustrated in FIG. 12, the inboard and outboard entry doors are latched to a door header 220 and the floor panels by door locks or latches (not shown) connected to the door lock controls 222.

Figure 17:
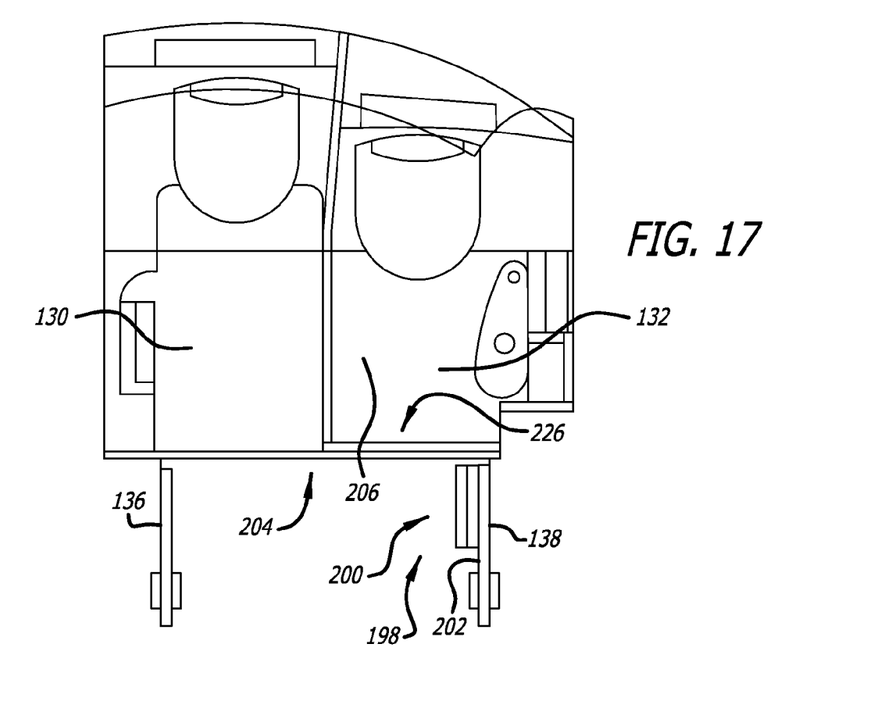
FIG. 17 is a top plan view similar to FIG. 16, showing further movement of the articulating movable lavatory wall or partition to a final position.
Figure 18:
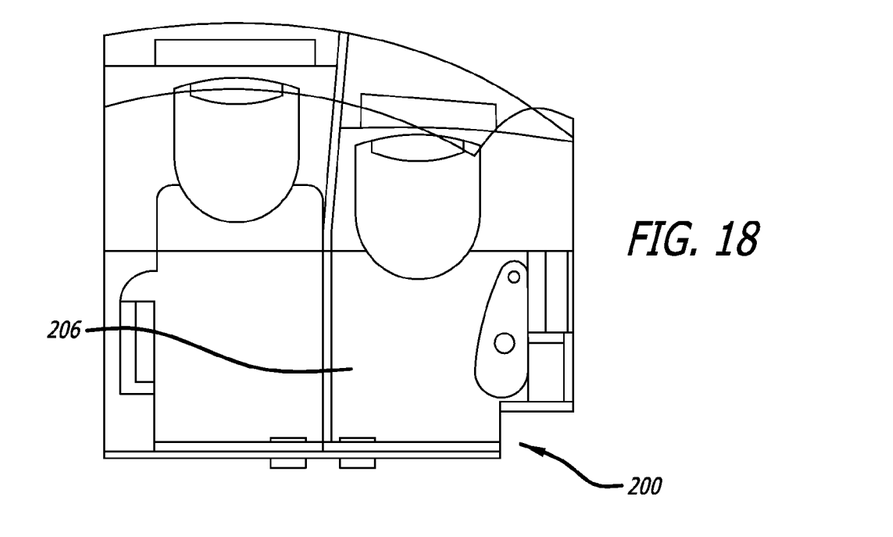
FIG. 18 is a top plan view similar to FIG. 17, showing the inboard and outboard lavatory doors closed, with the articulating movable lavatory wall or partition in the final position.
Figure 19:
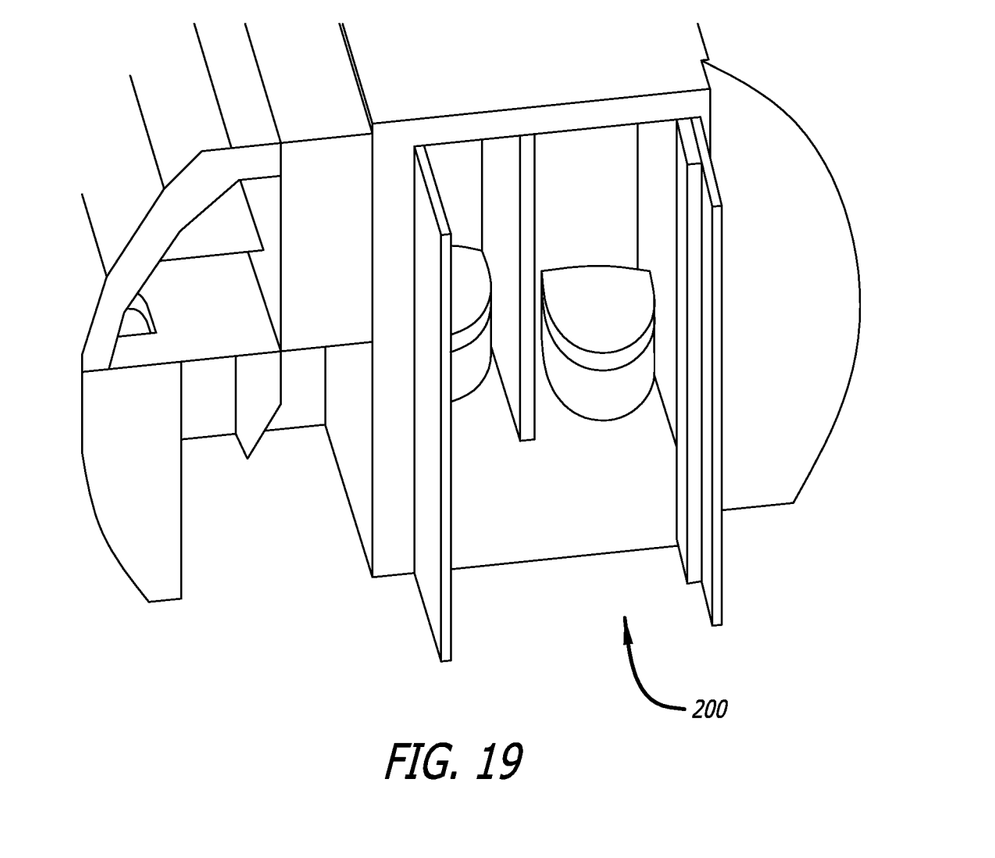
FIG. 19 is a top perspective view similar to FIG. 17, showing the inboard and outboard lavatory doors open, with the articulating movable lavatory wall or partition in the final position.

As is illustrated in FIGS. 13-19, showing the inboard and outboard doors unlatched, the upper and lower rollers of the articulating, folding partition sections can move along the upper and lower slide channels or guides toward the open outboard entry door to fold and stack against an inner portion of the open outboard entry door in the folded configuration in the final stowed position illustrated in FIGS. 17-19.

The door header of the outboard entry door includes cutouts 226, to allow the bifold rollers to pass through the door header, and a door footer similarly includes cutouts (not shown) to allow the bifold rollers to pass through the door footer, as the articulating, folding partition sections stack against the inner portion of the open outboard entry door in the final stowed position of the articulating, folding partition.

The aft galley and lavatory arrangements described above provide a number of benefits and advantages over prior art HPS arrangements, including:

1. By extending the galley and lavatory arrangement into the pressure dome (unlike the OEM arrangement shown in FIG. 1), the arrangement's footprint is maximized to provide an optimum amount of lavatory and galley space.

2. The galley and lavatory arrangements permit the lavatories to be located on either side of the aircraft such that restrictive portions of the aircraft's structure can be avoided and the galley's storage space maximized.

3. Unlike prior art galley and lavatory arrangements with stepped fronts, the galley and lavatory arrangement can include a substantially straight front surface.

4. The galley and lavatory complex can be provided in a modular lower section with separate walls that facilitate retrofit assembly within an aircraft.

5. The arrangement can include a stowable cabin attendant seat.

6. The adjacent inboard and outboard lavatories can be separated by a movable wall that facilitates optional access for persons with restricted mobility.

7. Unlike modular galley and lavatory arrangements, the lavatories and galley of the present invention can share loads through a center wall.

8. The galley and lavatory arrangement can accommodate a galley waste disposal unit.

9. The galley section can accommodate trolleys and standard containers that are arranged 2 to 3 deep, and can be accessed using known deep extraction systems.

10. In certain embodiments, the walls of the lavatories can be non-structural.

11. A modular lower section can have various configurations, such as a single lavatory, two lavatories, a urinal, etc., as well as other customer-selected options.

12. The modular lower section can have an extremely low center of gravity such that the lavatories do not require an overhead tie.

13. The modular lower section maximizes access to systems installation, since the modular lower section is installed in an aircraft before the lavatory walls are installed.

14. The design of the articulating movable lavatory wall or partition allows the lavatory partition to be removed from the center of the lavatory and stowed against the entry door while leaving the interior of the lavatory unobstructed for entry, egress and use of disabled passengers.

15. The design of the articulating movable lavatory wall or partition does not interfere with the normal operation of either inboard or outboard lavatory entry door, and will not allow the partition to be opened if either lavatory door is closed, eliminating the need for special locks, or access tools.

These and other features and advantages of the invention will be apparent to a person of ordinary skill in the art from a reading of the above description and a review of the drawings. It will be apparent from the foregoing that while particular forms of the invention has been illustrated and described, various modifications and substitutions may be made to the embodiments described herein without departing from the spirit and scope of the invention. Accordingly, the present invention is not intended to be limited such foregoing descriptions and drawings, but rather that they be illustrative of the invention. The scope of the present invention is intended to include all such modifications and substitutions as would be recognized by one of ordinary skill in the art.

We claim:

1. A combination lavatory and galley arrangement for aircraft, the combination lavatory and galley arrangement having a first side and an opposing second side, the combination lavatory and galley arrangement comprising:
a galley portion on the first side of the combination lavatory and galley arrangement; and
a lavatory portion on the opposing second side of the combination lavatory and galley arrangement, said lavatory portion including an inboard lavatory and an outboard lavatory, said inboard lavatory having an inboard entry door, and said outboard lavatory having an outboard entry door, wherein said lavatory portion comprises a modular housing containing said inboard lavatory and said outboard lavatory, said modular housing including a floor, inboard and outboard toilets, and inboard and outboard sinks, and said modular housing is dimensioned such that the modular housing is configured to be loaded aboard the aircraft through an aft door and assembled in a permanent location at a rear portion of the aircraft.

2. The combination lavatory and galley arrangement of claim 1, further comprising a cabin attendant seat stowage compartment between the galley portion and the inboard lavatory.

3. The combination lavatory and galley arrangement of claim 1, wherein said galley portion includes a trolley stowage bay configured to receive at least one half-size trolley configured to be cooled by chilled air circulated through the trolley stowage bay.

4. The combination lavatory and galley arrangement of claim 1, further comprising a movable partition between said inboard and outboard lavatories, said movable partition being movable between a stowed position and a deployed position, such that said inboard and outboard lavatories have substantially an equal first width when said movable partition is in the stowed position, said width being sufficiently wide to permit persons without restricted mobility to access and use the inboard and outboard lavatories, and the outboard lavatory having a second width greater than said first width when the movable partition is in the deployed position, said second width providing the outboard lavatory with a widened configuration that is sufficiently wide to permit a person with restricted mobility to access and use the outboard lavatory.

5. The combination lavatory and galley arrangement of claim 4, wherein said movable partition is configured to be articulated.

6. The combination lavatory and galley arrangement of claim 4, wherein said movable partition is configured to be bendable.

7. The combination lavatory and galley arrangement of claim 4, wherein said inboard lavatory is deeper than the outboard lavatory, such that a toilet in the inboard lavatory is positioned at least partially aft of a toilet in the outboard lavatory.

8. The combination lavatory and galley arrangement of claim 1, further comprising an articulating movable lavatory partition including articulating, folding partition sections, said articulating movable lavatory partition being movable between a first, linearly extended configuration at an approximate middle deployed position between said inboard and outboard lavatories, and a second, folded configuration in a stowed position against an interior surface of one of said inboard and outboard entry doors leaving the inboard and outboard lavatories in an unpartitioned configuration with a common interior unobstructed for entry, egress and use of persons with restricted mobility.

9. The combination lavatory and galley arrangement of claim 8, wherein said inboard and outboard lavatories include a partition frame including imbedded upper slide channels and a floor panel including imbedded lower slide channels, and said articulating, folding partition sections include corresponding upper rollers and lower rollers, allowing for fore and aft bifold movement of the articulating, folding partition sections.

10. The combination lavatory and galley arrangement of claim 9, wherein said articulating movable lavatory partition is configured to be secured in the first linearly extended configuration, such that the partition cannot be opened while the outboard lavatory door is closed.

11. The combination lavatory and galley arrangement of claim 10, wherein said inboard and outboard entry doors are configured to be latched to a door header and the floor panel.

12. The combination lavatory and galley arrangement of claim 11, wherein said upper and lower rollers of the articulating, folding partition sections can move along the upper and lower slide channels toward the outboard entry door to fold and stack against an inner portion of the outboard entry door in the folded configuration in a final stowed position of the articulating movable lavatory partition.

13. The combination lavatory and galley arrangement of claim 1, wherein said combination lavatory and galley arrangement is located aft of aft aircraft aft doors.

14. The combination lavatory and galley arrangement of claim 1, wherein the aircraft includes an aft pressure dome, and said combination lavatory and galley arrangement at least partially rearwardly extends into the pressure dome.

15. A combination lavatory and galley arrangement for aircraft, the combination lavatory and galley arrangement having a first side and an opposing second side, the combination lavatory and galley arrangement comprising:
   a galley portion on the first side of the combination lavatory and galley arrangement; and
   a lavatory portion on the opposing second side of the combination lavatory and galley arrangement, said lavatory portion including an inboard lavatory and an outboard lavatory, said inboard lavatory having an inboard entry door, and said outboard lavatory having an outboard entry door, wherein said lavatory portion includes a modular housing containing said inboard lavatory and said outboard lavatory, said modular housing including a floor, inboard and outboard toilets, and inboard and outboard sinks, and wherein said modular housing has a center of gravity that is sufficiently low to preclude the need for an overhead tie.

16. A combination lavatory and galley arrangement for aircraft, the combination lavatory and galley arrangement having a first side and an opposing second side, the combination lavatory and galley arrangement comprising:
   a galley portion on the first side of the combination lavatory and galley arrangement; and
   a lavatory portion on the opposing second side of the combination lavatory and galley arrangement, said lavatory portion including an inboard lavatory and an outboard lavatory, said inboard lavatory having an inboard entry door, and said outboard lavatory having an outboard entry door, wherein said lavatory portion includes a modular housing containing said inboard lavatory and said outboard lavatory, said modular housing including a floor, inboard and outboard toilets, and inboard and outboard sinks, and wherein said modular housing comprises associated non-structural exterior walls.

17. A combination lavatory and galley arrangement for aircraft, the combination lavatory and galley arrangement having a first side and an opposing second side, the combination lavatory and galley arrangement comprising:
   a galley portion on the first side of the combination lavatory and galley arrangement;
   a lavatory portion on the opposing second side of the combination lavatory and galley arrangement, said lavatory portion including an inboard lavatory and an outboard lavatory, said inboard lavatory having an inboard entry door, and said outboard lavatory having an outboard entry door; and
   an articulating movable lavatory partition including articulating, folding partition sections, said articulating movable lavatory partition being movable between a first, linearly extended configuration at an approximate middle deployed position between said inboard and outboard lavatories, and a second, folded configuration in a stowed position against an interior surface of one of said inboard and outboard entry doors leaving the inboard and outboard lavatories in an unpartitioned configuration with a common interior unobstructed for entry, egress and use of persons with restricted mobility, wherein said inboard and outboard lavatories include a partition frame including imbedded upper slide channels and a floor panel including imbedded lower slide channels, and said articulating, folding partition sections include corresponding upper rollers and lower rollers, allowing for fore and aft bifold movement of the articulating, folding partition sections, said articulating movable lavatory partition is configured to be secured in the first linearly extended configuration, such that the partition cannot be opened while the outboard lavatory door is closed, wherein said inboard and outboard entry doors are configured to be latched to a door header and the floor panel, said upper and lower rollers of the articulating, folding partition sections can move along the upper and lower slide channels toward the outboard entry door to fold and stack against an inner portion of the outboard entry door in the folded configuration in a final stowed position of the articulating movable lavatory partition, and wherein said door header of the outboard entry door includes cutouts, to allow the rollers to pass through the door header, and a door footer includes cutouts to allow the rollers to pass through the door footer as the articulating, folding partition sections stack against the inner portion of the open outboard entry door in the final stowed position of the articulating, folding partition.

* * * * *